US007613530B2

(12) United States Patent
Aiso et al.

(10) Patent No.: US 7,613,530 B2
(45) Date of Patent: Nov. 3, 2009

(54) APPARATUS AND PROGRAM FOR SETTING SIGNAL PROCESSING PARAMETER IN AN AUDIO MIXER

(75) Inventors: Masaru Aiso, Hamamatsu (JP); Akio Suyama, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 952 days.

(21) Appl. No.: 10/459,949

(22) Filed: Jun. 12, 2003

(65) Prior Publication Data

US 2003/0233158 A1 Dec. 18, 2003

(30) Foreign Application Priority Data

Jun. 14, 2002 (JP) ............................. 2002-173617
Apr. 30, 2003 (JP) ............................. 2003-125292

(51) Int. Cl.
*G06F 17/00* (2006.01)
*H04B 1/00* (2006.01)

(52) U.S. Cl. ........................................ 700/94; 381/119

(58) Field of Classification Search .................. 700/94; 381/104, 107, 109, 119
See application file for complete search history.

(56) References Cited

U.S. PATENT DOCUMENTS 4,879,751 A * 11/1989 Franks et al. ............... 381/119
5,239,458 A * 8/1993 Suzuki ......................... 700/83
5,940,521 A * 8/1999 East et al. ................... 381/119
6,153,994 A * 11/2000 Royer et al. ................ 318/466

* cited by examiner

*Primary Examiner*—Curtis Kuntz
*Assistant Examiner*—Daniel R Sellers
(74) *Attorney, Agent, or Firm*—Morrison & Foerster LLP

(57) ABSTRACT

Scene data including a set of values of a plurality of signal processing parameters are stored in a memory. Adjusting values (offset values) of the parameters stored in a buffer are each modified only when a user has performed operation for modifying the value, and never modified automatically. Upon selection of new scene data, the individual parameters of the new scene data are read out from the memory, and the value of at least one of the read-out parameters is modified in accordance with the adjusting value. The values of the parameters, including the thus-modified value of the parameter, are collectively set in a signal processor, such as a mixer. If the modified parameter value is beyond a predetermined limit value, a value corresponding to the limit value is set in the processor, in which case the adjusting value stored in the buffer is not changed.

6 Claims, 4 Drawing Sheets

SETTING PROCESS

APPARATUS AND PROGRAM FOR SETTING SIGNAL PROCESSING PARAMETER IN AN AUDIO MIXER

BACKGROUND OF THE INVENTION

The present invention relates to apparatus and computer programs for setting parameters that are to be used to set operating states of signal processing apparatus, such as digital audio mixers.

Conventional musical signal processing apparatus, such as digital audio mixers, have a so-called scene function, by which values of various operating parameters set in the processing apparatus are prerecorded as a set of scene data and the prerecorded scene data are read out, in response to a user's instruction, to thereby reproduce the settings of the operating parameters.

Any one of the values of the various parameters, included in the read-out scene data, can be modified or adjusted by user's manual adjusting operation. According to the conventional technique, if the value of a given parameter P among the parameters in the scene data is represented by "Psa", and assuming that the parameter value Psa has been adjusted by a value Δ through user's manual adjusting operation, a current value Pn of the parameter P can be expressed by "Pn=Psa+Δ", so that the manual adjusting value Δ can be regarded as "Δ=Pn−Psa". Therefore, the conventional technique is arranged in such a manner that, when new scene data has been read out, it determines a manual adjusting value Δ by subtracting the value Psa of the parameter P in the scene data, having been read out so far, from a current value Pn of the parameter P(Δ=Pn−Psa) and then calculates a new current value Pnew by adding the determined adjusting value Δ to a new value Psb of the parameter P(Pnew=Psb+Δ). In this way, it is possible to obtain the new value Pnew having the adjusting value Δ of the so-far performed manual adjusting operation reflected in the parameter value Psb of the new scene data. Where the adjusting value Δ equals an actual manual adjusting value, the above-mentioned operations would present no significant problem; however, if an upper limited process is performed as follows, then the operations would present the problem that the adjusting value Δ subsequently fails to equal the actual manual adjusting value.

The upper limited process is a process for, when the newly-calculated value Pnew (=Psb+Δ) is greater than a predetermined upper limit value Pmax, modifying or limiting the calculated value Pnew to equal the upper limit value Pmax. In this way, the calculated value Pnew is modified to equal the value Pmax and the value Ps+Δ' (i.e., Pnew=Pmax=Ps+Δ'), so that the adjusting value Δ' of manual adjusting operation would be altered to a value smaller than the actual adjusting value Δ. Then, when another scene data has been read out, the manual adjusting value is calculated as "Δ'=Pnew−Psb", and, if the value of the given parameter P in the other scene data is represented by "Psc", a new current value Pnew equals "Psc+Δ'". The adjusting value Δ' being reflected in the new current value Pnew is different from the actual adjusting value Δ. Namely, once the upper limit process is performed in the conventional technique, the adjusting value having lasted so far would decrease (be modified) from the value Δ to the value Δ', so that the user-intended adjusting value Δ would not be appropriately reflected in adjusting value Δ' to be used subsequently. Namely, with the conventional technique, user-intended adjusting values could not be determined uniquely, and adjustment as desired by the user could not always be performed reliably.

SUMMARY OF THE INVENTION

In view of the foregoing, it is an object of the present invention to provide a state setting apparatus and method which, irrespective of a value of read-out state setting data (scene data), can uniquely determine an adjusting value to be reflected in a setting state of signal processing of a mixer or the like and can appropriately reflect the adjusting value in the setting state while maintaining a user-intended adjusting value.

In order to accomplish the above-mentioned object, the present invention provides a state setting apparatus, which comprises: a setting data storage section that stores setting data representative of reference values of a plurality of parameters that are to be used for setting operating states of a signal processing circuit; an adjusting value storage section that stores an at least one adjusting value of at least one of the parameters; an adjusting value modification instruction section that instructs a modification of the at least one adjusting value in response to user's operation; an adjusting value renewal section that, in response to an adjusting value modification instruction given by the adjusting value modification instruction section, replaces the adjusting value, stored in the adjusting value storage section, with an instructed value; a setting data readout section that reads out the setting data from the setting data storage section; a setting value calculation section that, in response to readout, by the setting data readout section, of the setting data, calculates a setting value of the at least one parameter on the basis of the reference value represented by the setting data and the adjusting value stored in the adjusting value storage section; a setting value determination section that determines, as a new setting value of the at least one parameter, the setting value of the at least one parameter calculated by the setting value calculation section or a preset limit value, depending on whether or not the parameter calculated by the setting value calculation section is beyond the preset limit value; and an operation setting section that supplies a signal processing circuit with the new setting value of the parameter determined by the setting value determination section, wherein the adjusting value stored in the adjusting value storage section is not modified when the setting value of the at least one parameter calculated by the setting value calculation section is beyond the preset limit value.

In one embodiment, the state setting apparatus may further comprise an operator operable to modify the setting value of the at least one parameter, and wherein, in response to operation of the operator, the operation setting section may modify the new setting value determined by the setting value determination section and supply the modified new setting value to the signal processing circuit.

Further, the adjusting value storage section may store adjusting values corresponding to the parameters stored in the setting data storage section, and the adjusting value modification instruction section may modify each of the parameters independently of the other parameter.

Further more, the parameters to be set in the signal processing circuit may include one or more first-type parameters and one or more second-type parameters, and wherein the adjusting value storage section may store an adjusting value of at least one of the first-type parameter, and, in response to readout of the setting data, the operation setting section processing determines, as a new setting value of at least one of the second-type parameters, the reference value of the read-out setting data and supply the determined new setting value to the signal processing circuit.

According to a principal aspect of the present invention, the state setting apparatus (represented by a reference character A1 in the drawings and the Detailed Description of the Invention), having a function of using setting data (scene data) to collectively set various operating or processing parameters (P) of a signal processing circuit employed in a mixer or the like, operates as follows. Setting data representative of reference values (Ps) of a plurality of parameters are prestored in the setting data storage section (4: scene memory), and once an instruction is given, through user's operation, for modifying the adjusting value (offset value Δ P) of at least one of the parameters (P), an user-instructed adjusting value (ΔP) is stored in the adjusting value storage section (3: offset buffer) to update or renew the corresponding adjusting value so far stored in the adjusting value storage section. As the setting data are read out from the setting data storage section, the setting value calculation section calculates a setting value (parameter value Pn) of the at least one parameter by causing the adjusting value, now stored in the adjusting value storage section, to be reflected in (i.e., added to) the parameter reference value represented by the read-out setting data. Then, a new setting value (Pnew) of the at least one parameter is determined in accordance with a result of comparison, to a preset limit value (maximum or upper limit value Pmax), of the calculated setting value (Pn). That is, if the calculated setting value (Pn) is smaller than the limit value (Pmax) (Pn<Pmax), the calculated setting value (Pn) is determined directly as the new setting value (Pnew), while if the calculated setting value (Pn) is greater than the limit value (Pmax) (Pn>Pmax), then the calculated setting value (Pn) is rounded to the limit value (Pmax). The thus-determined new setting value (Pnew) of the at least one parameter is delivered to the signal processing circuit (A2).

In the present invention, only when the user has instructed a modification of the parameter adjusting value, the corresponding parameter adjusting value (ΔP) stored in the adjusting value storage section is changed to or replaced with a user-instructed value, and only at the time of readout of the setting data, a new parameter setting parameter (Pnew) is determined on the basis of the parameter reference value represented by the setting data and parameter adjusting value (ΔP) stored in the adjusting value storage section (3). Namely, the parameter adjusting value (ΔP) stored in the adjusting value storage section is changeable or modifiable only through user's intended operation, and it is never modified automatically. For example, even when the setting value (Pn) calculated on the basis of the parameter reference value of the setting data and adjusting value (Ps and ΔP) is beyond the parameter limit value (Pmax), the parameter adjusting value is not modified or left unchanged from the value currently retained in the adjusting value storage section. Therefore, irrespective of which of the parameter reference values of the state setting data (scene data) is read out, the present invention can uniquely determine at least one adjusting value ΔP to be reflected in the parameter reference value and thus can appropriately reflect the at least one adjusting value in a new setting value (Pnew) of the parameter while still maintaining a user-intended adjusting value.

Further, in the state setting apparatus of the present invention, with the function (M6) of modifying the parameter setting value (Pnew) in response to manual operation of a manual operator (FDc) operable to modify the setting value of a given parameter (P), a parameter setting value having been modified in accordance with an operated amount of the manual operator (FDc) can be set in the signal processing circuit (A2) instantly in response to manual operation of the manual operator (FDc). In the present invention, the setting value of each of the parameters, thus set in the signal processing circuit (A2), can be modified independently of the other parameters, using the above-mentioned parameter adjusting value (ΔP) or the manual operator (FDc). As noted above, each of the parameter adjusting values (ΔP) is modifiable only through user's intended positive operation, and it is never modified automatically; that is, mere user's modification of the parameter adjusting value alone does not immediately contribute to or achieve a modification of the corresponding parameter setting value in the signal processing circuit (A2). On the other hand, when the manual operator (FDc) is operated to modify any one of the parameter adjusting values (ΔP), the thus-modified value can be reflected in the parameter setting values, set in the signal processing circuit, instantly in response to the operation of the manual operator (FDc).

Further, in the present invention, adjusting values (ΔP) corresponding to a plurality of parameters (P) included in the setting data are stored in the adjusting value storage section (3), and any desired one of the stored adjusting values (ΔP) can be modified via the adjusting value modification instruction section (FS; M1, M2) independently of the other stored adjusting values (ΔP). Furthermore, in the present invention, the parameters (P) to be set in the signal processing circuit (A2) include first and second-type parameters (FIG. 4). For any designated first-type parameter, a desired adjusting value (ΔP) is stored in the adjusting value storage section (3) and reflected in the parameter reference value (Ps) of the setting data in the manner as set forth above, while, for any designated second-type parameter, the parameter reference value (Ps) included in read-out setting data can be directly send, as a new setting value (Pnew), to the signal processing circuit (A2) by means of the operation setting section.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE EMBODIMENTS

[Hardware Setup]

Figure 1:
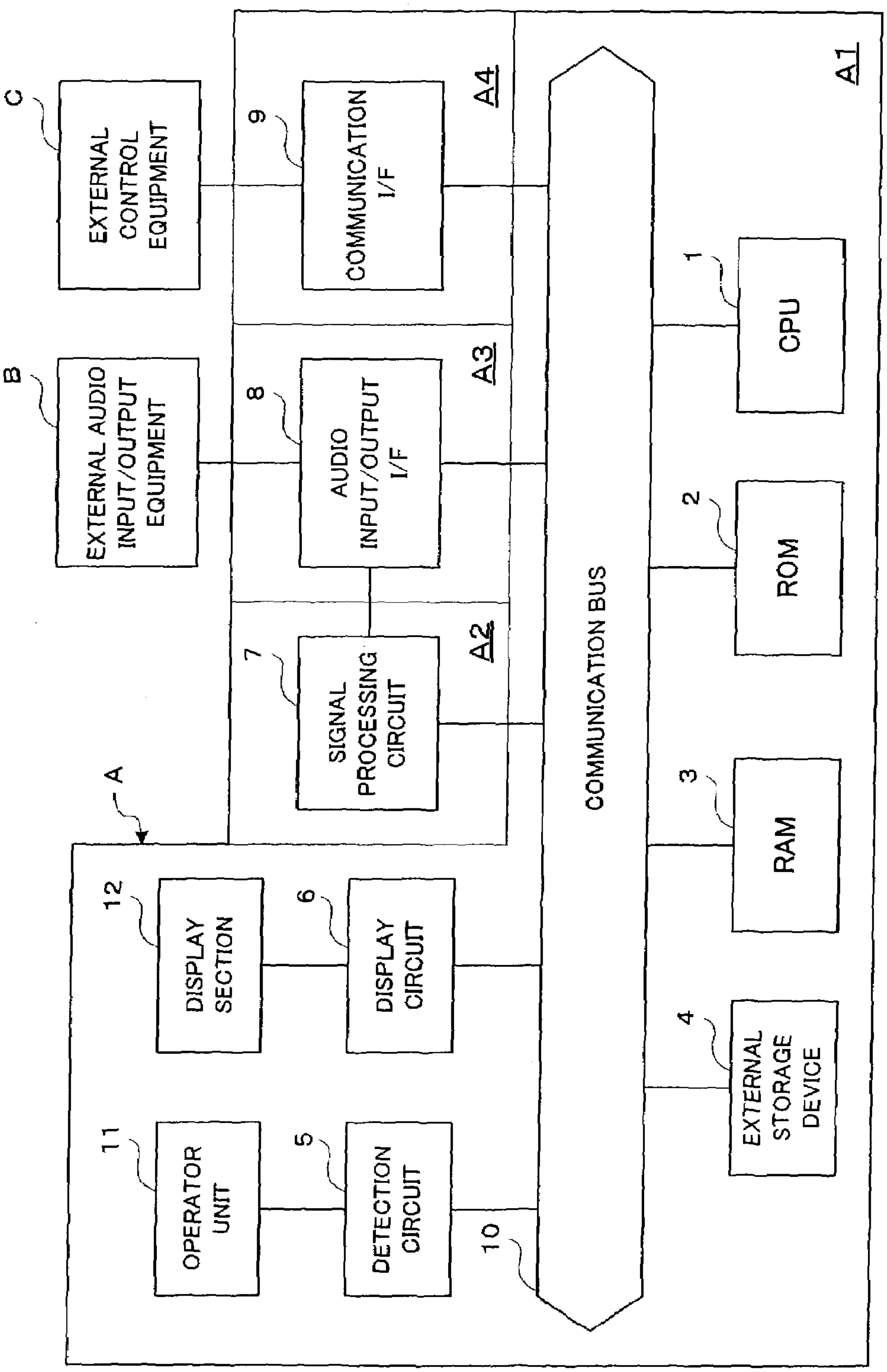
FIG. 1 is a block diagram showing a hardware setup of a digital audio mixer to which is applied a state setting system in accordance with an embodiment of the present invention.

FIG. 1 is a block diagram showing an example hardware setup of a digital audio mixer to which is applied a state setting system in accordance with an embodiment of the present invention. In FIG. 1, the digital audio mixer A includes a central processing unit (CPU) 1, a read-only memory (ROM) 2, a random access memory (RAM) 3, an external storage device 4, a detection circuit 5, a display circuit 6, a signal processing circuit 7, an audio input/output interface (I/F) 8, a communication interface (I/F) 9, etc. These components 1-9 are interconnected via a communication bus 10.

The above-mentioned CPU 1, ROM 2, RAM 3, external storage device 4, detection circuit 5 and display circuit 6, along with an operator unit 11 connected to the detection circuit 5 and a display section 12 connected to the display circuit 6, together constitute a control section A1 of the digital audio mixer A. The CPU 1 controls the entire mixer A in accordance with predetermined software programs. For example, the CPU 1 controls mixing processing performed by the signal processing circuit 7; particularly, the CPU 1 carries out state setting processing for setting operating states of the audio mixer A.

In the ROM 2, there are prestored predetermined control programs that include not only various programs pertaining to ordinary mixing processing and state setting processing but also various tables and various data associated with these processing. In the RAM 3, there are stored information, such as flags and buffers, to be used in the ordinary mixing processing and state setting processing. For example, the RAM 3 includes an offset buffer for storing adjusting values that are to be used to offset or modify settings of the mixer A for individual ones of various parameters. The adjusting values will hereinafter be referred to as "offset values", or simply as "offsets".

The external storage device 4 uses any of storage media, such as a hard disk (HD), compact read-only memory (CD-ROM), floppy disk (FD), magneto-optical (MO) disk, digital versatile disk (DVD) and memory card (PC card), to store various control programs and various data. For example, the external storage device 4 can be used as a scene memory for storing a plurality of sets of scene data having all operating settings of the digital audio mixer recorded therein.

The operator unit 11 connected to the detection circuit 5 includes operators (CP1-CP4 of FIG. 2), such as switches, dials and faders (sliders), which are provided, for example, on an operation panel PN (FIG. 2) of the control section A1. The detection circuit 5 generates control data in response to operation, by a user, of any of the operators in the operator unit 11, and delivers the generated control data to the display circuit 6 and signal processing circuit 7. Also, the offset values can be delivered to and visually shown by the display circuit 6.

The display section 12 connected to the display circuit 6 includes a screen display section CP5, channel (CH) display sections DPc and various indicators provided on the operation panel PN. The display circuit 6 causes the display section 12 to visually display contents corresponding to control data received from the detection circuit 5 or from the communication I/F 9. On the operation panel PN, there is provided, for each input/output channel, a dedicated channel controller ChC that is composed of a predetermined operator on the operator unit 11 and the channel display section DPc on the display section 12.

The signal processing circuit 7, including a DSP engine as its principal component, constitutes a signal processing section A2 that functions as a signal processing center of the digital audio mixer A. The signal processing circuit 7 processes input audio signals of a plurality of channels, received via the audio input/output I/F 8, in accordance with settings based on the contents of the scene data or user operation on the operator unit 11, and it sends the processed audio signals of the individual channels back to the audio input/output I/F 8.

The audio input/output I/F 8, including an analog-to-digital (AD) converter and digital-to-analog (D/A) converter, constitutes an input/output (I/O) section A3 of the mixer A, which relays input audio signals of the channels to or from external audio input/output equipment B. Namely, the audio input/output I/F 8 relays input audio signals from the external audio input/output equipment B to the signal processing circuit 7 (after converting the signals into digital representation if the signals are analog signals), or output audio signals from the signal processing circuit 7 to the external audio input/output equipment B (after converting the signals into analog representation if the signals are digital signals).

The signal processing circuit 7 and audio input/output I/F 8 also have MIDI signal processing and relaying functions, and the external audio input/output equipment B may be a MIDI device, such as an electronic musical instrument or automatic performance device. Therefore, the signal processing circuit 7 is arranged to receive a MIDI signal from the MIDI device B via the input/output I/F 8 and output a digital audio signal, generated using a tone generator circuit or the like, to the audio input/output equipment B.

Further, the communication I/F 9 constitutes an additional control section A4 of the mixer A, to which is connected external digital control equipment C, such as a personal computer, capable of generating control data similar to those generated via the operators of the operator unit 11. Thus, the communication I/F 9 can receive, from the external digital control equipment C, control data, similar to those generated via the operators of the operator unit 11. Also, when some data or control program is received from the external digital control equipment C via the communication I/F 9, the received data or control program can be stored in the external storage device 4. Note that the external digital control equipment C may be connected to the communication I/F 9 via a communication network, such as a local area network (LAN), Internet or telephone line.

Now briefly describing operation of the mixer, the audio input/output I/F 8 receives audio signals of a plurality of the channels (CHs) from the external audio input/output equipment B and passes the received signals of the channels to the signal processing circuit 7. When the signal processing circuit 7 receives control data from the detection circuit 5 or control data, similar to those generated via the operators of the operator unit 11, generated and transmitted by the external digital control equipment C, it processes (mixes) the input audio signals of the channels, received via the input/output I/F 8, on the basis of the received control data. Then, the signal processing circuit 7 sends the mixed signals to the audio input/output I/F 8, so that the audio input/output I/F 8 transmits the mixed audio signals from the signal processing circuit 7 to the audio input/output equipment B.

[Example Construction of the Operation Panel]

Figure 2A:
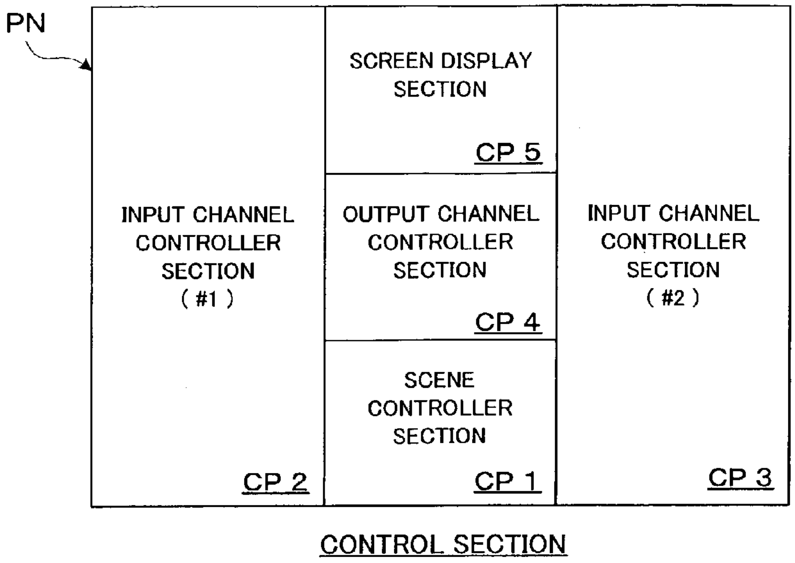
FIG. 2 is a view schematically showing an outer appearance of a control section (operation panel) in the embodiment of the present invention.

FIG. 2A is a schematic plan view roughly showing an example of construction of the operation panel PN employed in the state setting system of the present invention. The operation panel PN of the control section A1 in the mixer A is slightly slanted downwardly in a direction toward an end edge facing the user or human operator, and it is also called a "controller panel". As shown, the controller panel PN is segmented into the controller sections CP1-CP4 and screen display section CP5, and various operators of the operator unit 11 and various display elements of the display section 12 are provided on the scene controller sections CP1-CP4 and screen display section CP5.

Figure 2B:
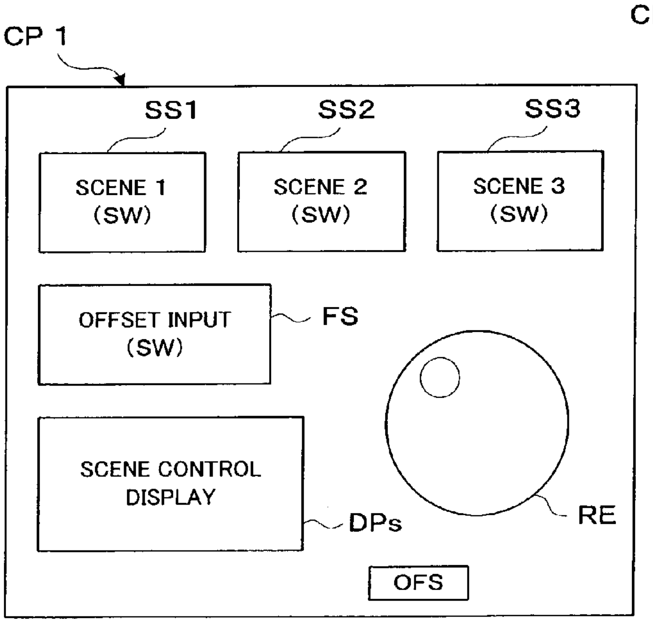

Each of the controller sections CP1-CP4 of the operation panel PN is provided to set operating states of the mixer A. As shown in FIG. 2B, the scene controller section CP1 includes an offset input switch FS to initiate setting input of offset values of scene data, a plurality of scene selecting switches SS1-SS3 for designating a desired one of scene numbers of scene data sets (in the illustrated example of FIG. 2B, the number of selectable scenes is "3"), operator, such as a rotary encoder RE, for setting various offset-related parameter values, and a scene control display DPs for displaying offset values etc.

The scene controller section CP1 also includes an offset reflection setting switch OFS to set whether or not to reflect an offset value (turn ON or OFF a reflection mode) in each of the scene data. By operating the offset reflection setting switch OFS prior to readout of scene data, the scene data is read out onto the screen display section CP5 or scene control display DPs. By sequentially setting "ON (value 1)" or "OFF (value 0)" in offset reflection flags for individual parameters while viewing the parameters of individual types and individual channels, the user can set in advance, for each of the parameters, ON/OFF of the offset reflection mode, i.e. whether or not the offset should be reflected in the parameter. The scene controller section CP1 includes various other operators than those shown in FIG. 2B, although not specifically shown in the figure to avoid complexity.

Then, with the above-described components, the user can set various parameters. For example, the scene selecting switches SS1-SS3 correspond to a plurality of (three in the illustrated example) sets of scene data having been selected as necessary from among a multiplicity of sets of scene data stored in the scene memory of the external storage device 4. By operating any one of the scene selecting switches SS1-SS3, a desired scene data set can be selectively read out from among a multiplicity of scene data sets stored in the scene memory of the external storage device 4. Further, by operating the rotary encoder RE, the user can enter an offset value of at least one scene data in the read-out scene data set, a channel for which a parameter is to be set, a kind of parameter or the like, in accordance with an operation setting environment at the time of the operation of the rotary encoder RE.

Input controller section of the operation panel PN comprises a pair of left and right input controller sections: the first input channel controller section (#1) CP2 and second input channel controller section (#2) CP3. The output controller section CP4 is provided at the center of the operation panel PN, and the screen display section CP5, comprising an LCD and/or CRT, is provided on an upper middle area of the operation panel PN, remotely from the human operator, and adjustably slanted relative to the general plane of the operation panel PN.

Figure 2C:
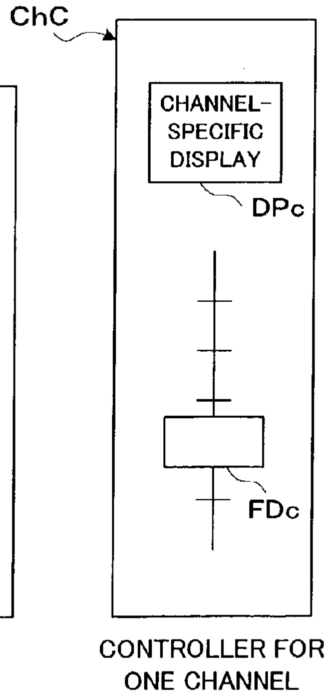

The input/output controller sections, i.e. the input channel controller sections CP2 and CP3 and output controller section CP4, each include input/output channel controllers ChC, such as the one of FIG. 2C, in corresponding relation to the input and output channels.

Each of the input/output channel controllers ChC is a controller for, in response to manual operation of the user, setting a control state of mixing processing for the channel in question, which includes the channel-specific display (e.g., character and numeral display) DPc, sliding operator FDc called a "fader", and other operators. The channel-specific display DPc visually displays various information, such as the name of the channel (CH) and various offset values of the channel. By operating the fader FDc, the user can control an input or output level of an audio signal corresponding to the channel controller ChC in question. Note that each of the channel controllers ChC includes various other operators corresponding to parameters to be set, although not specifically shown to avoid complexity of illustration.

As known in the art, various mixing parameters set in the signal processing circuit 7 (FIG. 1) can be modified or adjusted in real time in response to user's manual operation of the input and output channel controller sections CP2, CP3 and CP4. Once a desired scene is selected via the scene controller section CP1, a set of parameters (set of scene data) corresponding to the selected scene are read out and delivered to the signal processing circuit 7 (FIG. 1), by which various mixing parameters to be used in the signal processing circuit 7 are collectively modified (or set). Variable adjustment can be performed on the individual parameters of the read-out scene data in accordance with user's operation of any of the channel controller sections CP2, CP3 and CP4.

When offset values are to be entered and set on the basis of operation of the offset input switch FS of the scene controller section CP1, only offset values stored in the offset buffer are rewritten without the various mixing parameters set in the signal processing circuit 7 being modified in real time, as will be later described. The offset values stored in the offset buffer are read out from the buffer in response to user's scene selecting operation, so that the values of the corresponding parameters in the selected scene data set are modified (offset) in accordance with the read-out offset values. Namely, the scene data modified in accordance with the offset values are set collectively, along with various other mixing parameters, in the signal processing circuit 7. Of course, the individual parameters in the scene data set, having been modified in accordance with the offset values and then set in the signal processing circuit 7, can be further variably adjusted in real time in accordance with user's operation of any of the channel controller sections CP2, CP3 and CP4. However, the offset values stored in the offset buffer are not modified through the real time adjustment based on the user's operation of any of the channel controller sections CP2, CP3 and CP4. Further, when the values of the corresponding parameters in the selected scene data set are to be modified in accordance with the offset values read out from the offset buffer, and if any of the changed parameter values is beyond a predetermined limit value, the offset value is equivalently modified to a smaller value than the predetermined limit; however, in this case too, the offset values stored in the offset buffer themselves are not modified.

[Main Processing Flow and Scene Data]

Figure 3:
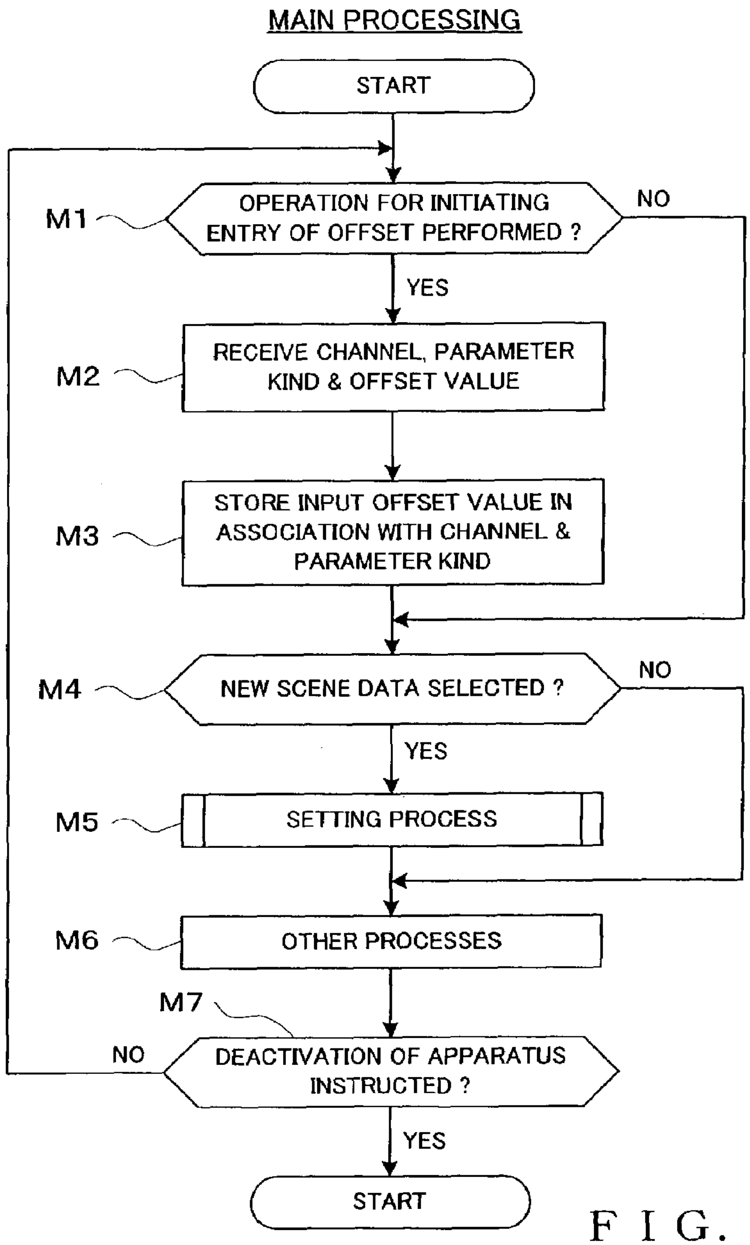
FIG. 3 is a flow chart showing main processing carried out in the embodiment of the present invention.
Figure 4:
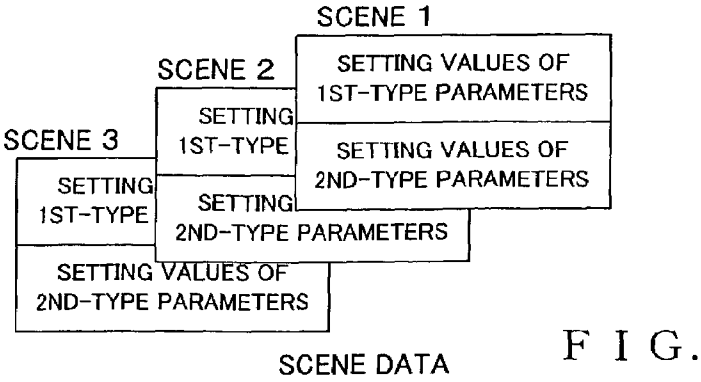
FIG. 4 is a diagram showing an example format of scene data employed in the embodiment of the present invention.

FIG. 3 is a flow chart showing main processing carried out in an embodiment of the state setting system of the present invention. FIG. 4 is a diagram showing an example format of scene data employed in the embodiment of the state setting system. In the state setting system, sets of scene data, representative of settings (setting values) of various processing parameters of the mixer A, are read out from the scene memory of the external storage device 4 into the RAM, in corresponding relation to a plurality of scenes (in the illustrated example of FIG. 4, three scenes, scene 1-scene 3). Each of the scene data sets is collective setting information representative of settings (setting values) of processing parameters of all available input and output channels, which includes setting values of first-type and second-type parameters as illustrated in FIG. 4.

The first-type parameters are parameters capable of representing successive numerical values, on which an offset modification process can be performed using offset values. For example, the first-type parameters include parameters representative of input and output levels, mixing levels, sound image localization positions, effect impartment levels, etc. In the offset modification process, the settings of these parameters are used as reference values. The second-type parameters, on the other hand, are parameters representative of absolute values, such as ON/OFF states and numbers. For example, among the second-type parameters are ones representative of a type of an effect to be set and ON/OFF state of a tone muting mode. Offset modification process is not performed on the second-type parameters.

In the main processing of FIG. 3, a determination is made at first step M1 as to whether or not the user has performed operation for initiating entry of an offset value for any of the first-type parameters. If the user has performed such operation for initiating entry of an offset value (YES determination at step M1), the main processing moves on to an offset setting process of steps M2 and M3. At step M2, the processing receives inputs of a channel (CH) for which an input offset is to be applied, a kind of parameter and value ΔP of the offset (also referred to as a "(parameter) adjusting value").

At step M2, a unique number of an input or output channel (CH) to which the offset to be entered should be applied is selected by the user manipulating the rotary encoder RE immediately after operation of the offset input switch FS. The selected channel number is displayed on the display CP5, so that the user can visually ascertain the displayed number and then operate the offset input switch FS to thereby cause the selected channel number to be duly input (or set).

Then, a desired kind of parameter is selected by the user manipulating the rotary encoder RE. The selected parameter kind is displayed on the display CP5, so that the user can visually ascertain the displayed parameter kind and then operate the offset input switch FS to thereby cause the selected parameter kind to be duly input (or set). Further, a desired offset value ΔP is selected by the user manipulating the rotary encoder RE. The selected offset value is displayed on the display CP5, so that the user can ascertain the displayed offset value and then operate the offset input switch FS to thereby cause the selected offset value ΔP to be duly input (or set).

Note that a desired offset value can be set by operating the channel controller ChC instead of performing the above-described sequential operation of the rotary encoder RE and offset input switch FS. Namely, an offset value ΔP corresponding to an operated amount of the fader FDc can be input directly and promptly, for each channel and parameter kind, by the user, after first operation of the offset input switch FS, operating the fader FDc of the channel controller of the desired channel and operating the offset input switch FS again.

At following step M3, the offset value input at step M2 is stored in the offset buffer of the RAM 3, in association with the channel and parameter kind also input at step M2. In this way, the offset value for each of the channels and for each of the parameter kinds is retained in the offset buffer, and, in a later-described setting process of step M5, the offset value is read out from the buffer and reflected in newly-selected scene data. Note that a common offset value (adjusting value) may be input for a particular group of the channels and parameters, instead of separate offset values being input for the individual channels and parameter kinds. In the offset buffer are stored offset values input for a plurality of selected channels and parameters.

As a modified example of the offset value setting process, there may be provided an offset locking function to prevent an offset value from being modified through user's modifying operation. For example, the offset locking function is a function for storing offset locking flag information for each of a plurality of offset values, inhibiting modification of each offset value for which the offset locking flag is ON, and permitting modification, based on user's operation at steps M2 and M3 above, of only each offset value for which the offset locking flag is OFF. With such an offset locking function, it is possible to prevent offset values from being modified unnecessarily. Particular kinds of parameters for which an offset value modification should be inhibited may be either factory-preset or selected or set by the user.

After completion of the offset storage operation at step M3, or if it is determined that the user has performed no operation for initiating entry of an offset value (NO determination at step M1), the processing jumps to step M4, where a further determination is made as to whether a new scene data set has been selected. If a new scene data set has been selected by operation of any on of the scene selecting switches SS1-SS3 as determined at step M4, the processing proceeds to step M6 after performing the setting process of step M5; otherwise, the processing directly proceeds to step M6. A detailed description of the setting process of step M5 will be followed with reference to FIG. 5.

At step M6, other processes pertaining to other user operation etc. are carried out. Such other processes include, for example, a signal process where control data, based on values of various parameters directly entered via the controller sections CP1-CP4 and screen display section CP5, are delivered to the signal processing circuit 7 so that setting states of various processing parameters are modified as desired in response to user's manual operation by manual operators such as the fader FDc or the like, and a process for setting, for each parameter or each scene data, whether or not an offset should be reflected. Namely, the values of various parameters set in the signal processing circuit 7 are modified in real time in response to user's manual adjusting operation of the various parameters via the controller sections CP1-CP4.

Unlike the offset value, an operation value manually entered by such a manual operator FDc is reflected in the signal processing circuit 7 instantly in response to the manual operation of the operator FDc. Namely, in this case, once the operator FDc is manually operated by the user, a new setting value of the parameter is determined on the basis of an operation value obtained from an operated amount of the operator FDc and a value set in the signal processing circuit 7 at the time of the user's operation of the operator FDc. Such a new setting value of the parameter may be determined by adding (subtracting, multiplying or dividing) the operation value of the manual operator to (from or by) the corresponding value set in the signal processing circuit 7.

As will be set forth in relation to the setting process of step M5, the offset values stored in the offset buffer are utilized only at the time of readout of the scene data, and the function of modifying the parameter setting value in accordance with the offset value is completely different from the function of modifying the parameter setting value via the manual operator such as the fader FDc (where the modified setting value is reflected in the signal processing circuit 7 instantly in response to the operation of the manual operator). More specifically, when a modification of an offset value has been instructed by user operation of the offset input switch Fs etc. an instructed modified value is not sent to the signal processing circuit 7 at that time, i.e. instantly in response to the operation of the offset input switch Fs etc; thus, the corresponding parameter setting value in the signal processing circuit 7 is not modified at that time. Further, the offset value is modifiable only through user's intended operation, and it is never changed or modified automatically. For example, even when a sum of a parameter value of read-out setting data and an offset value retained in the offset buffer is beyond a limit value (upper limit value) preset for the parameter in question and thus the upper limit value is set as a new setting value to be supplied to the signal processing circuit 7 (see setting step S6 of FIG. 5), the offset value is not modified and left unchanged from the already stored value.

After step M6, it is further determined at step M7 whether or not deactivation of the apparatus has been instructed. If deactivation of the apparatus has not been instructed as determined at step M7 (NO determination at step M7), the processing reverts to step M1 in order to repeat the operations of steps M1-M6 until deactivation of the apparatus is instructed. If deactivation of the apparatus has been instructed (YES determination at step M7), the main processing is brought to an end.

[Flow of the Setting Process]

Figure 5:
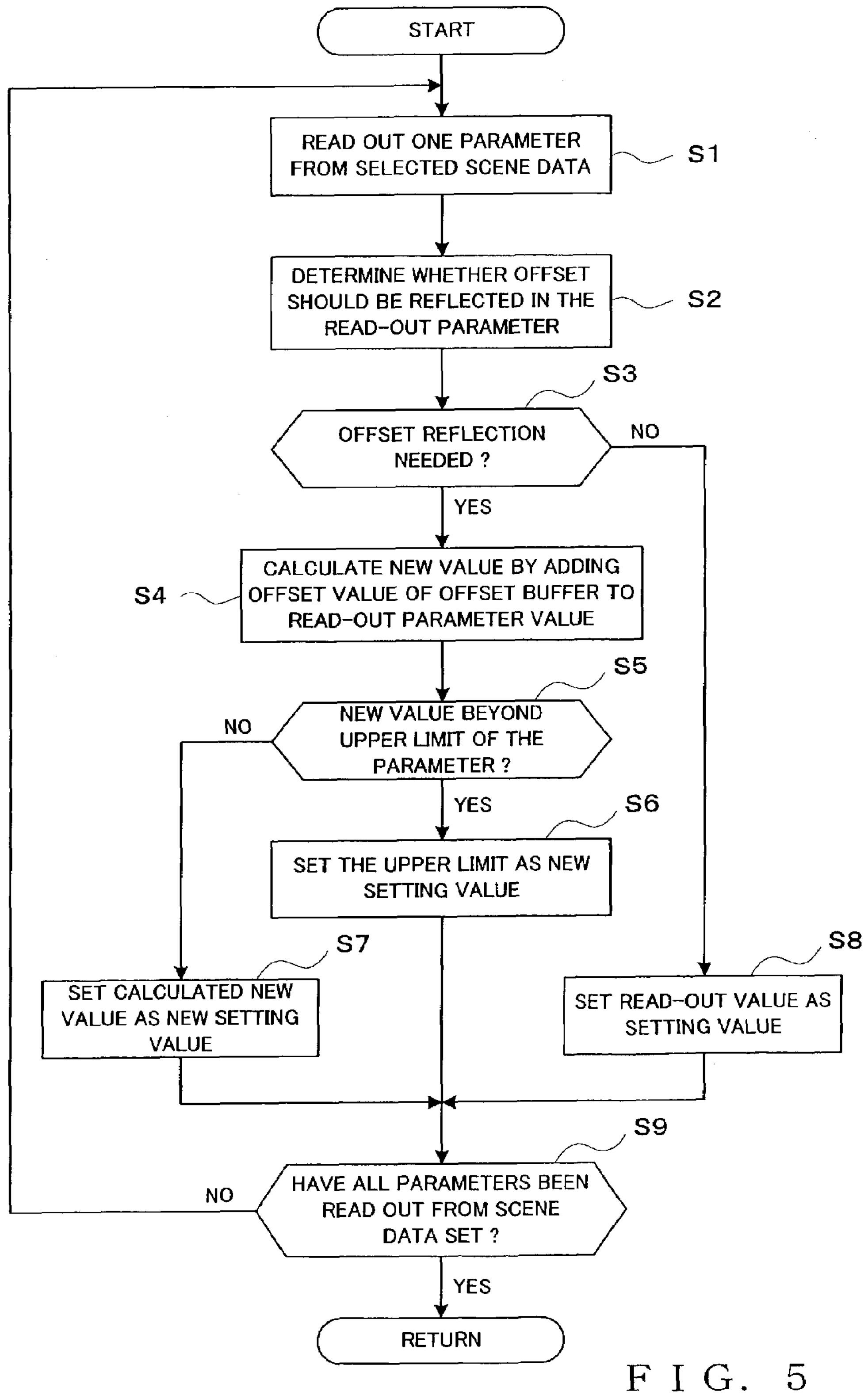
FIG. 5 is a flow chart of a setting process carried out in the embodiment of the present invention.

FIG. 5 is a flow chart of the setting process carried out in the embodiment of the present invention. Each of a plurality of sets of scene data stored in the scene memory of the external storage device 4 is each collective setting information for collectively setting many processing parameters in the mixer A. The setting information of the first-type parameters becomes reference values in the offset process. Predetermined plural number of (e.g., three) scene data sets from among the plurality of scene data sets are set such that any desired one of the predetermined scene data sets can be selected by user's operation of one of the scene selecting switches SS1-SS3 prior to start-up of the mixing processing of the mixer A. Thus, once step M4 (FIG. 3) determines that any one of the scene selecting switches SS1-SS3 has been operated by the user to newly select a desired one of the scene data sets, the setting process at step M5, i.e. of FIG. 5, is executed.

The following paragraphs briefly describe an exemplary step sequence of the state setting process of FIG. 5. In the scene memory of the state setting system, there are prestored a plurality of sets of scene data sets each for collectively setting various operating or processing parameters of the musical signal processing circuit 7 (A2). In the offset buffer, there are set or stored offset values (adjusting values) ΔP of various parameters (first-type parameters) in response to user's operation of the offset input switch FS (steps M1-M3 of FIG. 3). When a scene data set is selected by user's operation of any one of the scene selecting switches SS1-SS3 (step M4 of FIG. 3), parameter values (reference values) Ps of the selected scene data set are read out one by one from the scene memory (step S1 of FIG. 5). Then, for any designated one of the parameters, a new setting value Pnew is determined on the basis of a value Pn having the offset value ΔP reflected therein and in the light of a preset limit value (upper limit value) Pmax (steps S4-S7 of FIG. 5).

The following paragraphs describe details of the setting process. Namely, at step S1 of FIG. 5, parameters are read out one by one from the selected scene data set. Then, a determination is made at step S2 as to whether or not the newly read-out parameter is one in which an offset is to be reflected, and it is further determined at next step S3 whether there is a need for the offset reflection.

If an offset value corresponding to the parameter kind and channel is currently retained in the offset buffer and the offset reflection flag is currently ON, it is determined at step S3 that the offset reflection is needed (YES determination at step S3), and then the process proceeds to step S4. At step S4, the offset value ΔP currently retained in the offset buffer is added to the value Ps of the newly read-out parameter P (also referred to as a "parameter reference value") to thereby calculate a new parameter value Pn. At following step S5, it is determined whether the thus-calculated new parameter value Pn is greater than the upper limit value Pmax preset for the parameter.

If the calculated value Pn is greater than the upper limit value Pmax of the parameter as determined at step S5 (YES determination at step S5), the process goes to step S6, where a setting change is made such that the upper limit value Pmax is set as the new parameter setting value Pnew. Otherwise (with a NO determination at step S5), the process branches to step S7, where a setting change is made such that the new parameter value Pn calculated at step S4 is set as the new parameter setting value Pnew. Note that the terms "setting change" here means moving the successive value operator, such as the fader FDc corresponding to the parameter P to be modified, to a position corresponding to the new parameter setting value Pnew, replacing a displayed value of the parameter on the channel-specific display DPc with the new setting value Pnew, and then delivering the new setting value Pnew to the signal processing circuit 7.

If, on the other hand, the offset reflection is not needed as determined at step S3 (NO determination at step S3), the process moves to step S8, where a setting change is made such that the newly read-out parameter value is set as the new setting value and the new setting value is delivered to the signal processing circuit 7.

For example, if the parameter read out at step S1 is a second-type parameter, no offset reflection is executed since there is no offset value to be reflected. Even if the parameter read out at step S1 is a first-type parameter, no offset reflection is executed in case no offset value is stored in the offset buffer. Further, even if the parameter read out at step S1 is a first-type parameter and an offset value is stored in the offset buffer, no offset value is reflected in the parameter of the channel as long as the offset reflection flag is OFF and hence the offset reflection mode is OFF.

The process moves to step S9 after completion of the setting change process of steps S6-S8, where a further determination is made as to whether all of the parameters have been read out from the selected scene data set. With a negative (NO) determination at step S9, the setting process reverts to step S1 to read out another or new parameter from the selected scene data set, so that the operations of steps S2-S8 above are repeated on the new parameter. Then, after the setting process has been performed on all the parameters of the selected scene data set (YES determination at step S9), the setting process is brought to an end.

In summary, according to the present invention arranged in the above-described manner, only when the user has instructed a modification of a parameter adjusting value, the corresponding parameter adjusting value (offset value) stored in the adjusting value storage section is changed to or replaced with a user-instructed value, and in response to readout of setting data (scene data), a new parameter setting parameter is determined on the basis of a parameter reference value represented by the read-out setting data and a stored parameter adjusting value. Even when the setting value calculated on the basis of the parameter reference value and adjusting value is beyond a predetermined parameter limit value, the parameter adjusting value is not modified or left unchanged from the value currently retained in the adjusting value storage section. Therefore, irrespective of which of the parameter reference values of the state setting data is read out, the present invention can uniquely determine an adjusting value to be reflected in the parameter reference value and thus can appropriately reflect the adjusting value in a new setting value of the parameter while still maintaining a user-intended adjusting value.

The present invention relates to the subject matter of Japanese Patent Application No. 2002-173617, filed on Jun. 14, 2002, the disclosure of which is expressly incorporated herein by reference in its entirety.

What is claimed is:

1. A state setting apparatus for audio mixing comprising:

a setting data storage section that stores a plurality of setting data representative of reference values of a plurality of parameters that are to be used for setting operating states of a signal processing circuit;

an adjusting value storage section that stores an adjusting value;

an adjusting value flag storage section that stores, for each of the parameters, an adjusting value flag indicating whether or not to use the adjusting value;

a setting data selection section that selects one item of said plurality of setting data stored in said setting data storage section;

a determination section that determines, for each of the parameters, whether or not to use the adjusting value with reference to the adjusting value flag stored in said adjusting value flag storage section;

a first operation setting section that, for each of the parameters for which said determination section has determined that the adjusting value should not be used, supplies the signal processing circuit with the reference value represented by the setting data selected by said setting data selection section;

a setting value calculation section that, for each of the parameters for which said determination section has determined that the adjusting value should be used, calculates a new setting value of the parameter on the basis of the reference value represented by the one item of setting data selected by said setting data selection section and the adjusting value stored in said adjusting value storage section; and a second operation setting section that supplies the signal processing circuit with the new setting value calculated by said setting value calculation section.

2. A state setting apparatus for audio mixing as claimed in claim 1 wherein said adjusting value storage section stores adjusting values corresponding to the parameters stored in said setting data storage section.

3. A state setting apparatus for audio mixing as claimed in claim 1 wherein parameters to be set in the signal processing circuit include one or more first-type parameters and one or more second-type parameters, and wherein said adjusting value storage section stores an adjusting value of at least one of said first-type parameter, and, in response to selection of the one item of setting data, said operation setting section processing determines, as a new setting value of at least one of said second-type parameters, a reference value from amongst the reference values of the selected one item of setting data and supplies the determined new setting value to the signal processing circuit.

4. A state setting apparatus for audio mixing as claimed in claim 1, further comprising:

an adjusting value modification instruction section that instructs a modification of the adjusting value in response to user's operation;

an adjusting value renewal section that, in response to an adjusting value modification instruction given by the adjusting value modification instruction section, replaces the adjusting value stored in said adjusting value storage section with an instructed value, and an operator operable to modify the setting value of the at least one parameter, wherein, in response to operation of said operator, said operation setting section modifies the new setting value and supplies the modified new setting value to the signal processing circuit, and wherein whether or not a modification, via said operator section, of the adjusting value should be inhibited can be set for each of the parameters.

5. A state setting apparatus for audio mixing as claimed in claim 1 which is used in an audio signal mixer, and wherein the signals processing parameters are parameters to be used for processing by the audio signal mixer.

6. A computer-readable medium containing a program for causing a computer to perform a state setting method for audio mixing, said computer being provided in a state setting information processing apparatus which includes a setting data storage section that stores a plurality of items of setting data representative of reference values of a plurality of parameters to be used for setting operating states of a signal processing circuit and an adjusting value storage section that stores an adjusting value, said signal processing parameter setting method comprising the steps of:

a step of storing, for each of the parameters, an adjusting value flag indicating whether to use the adjusting value;

a step of selecting one item of one of said plurality of setting data stored in said setting data storage section;

a step of determining, for each of the parameters, whether to use the adjusting value with reference to the adjusting value flag stored in said adjusting value flag storage section;

a step of supplying, for each of the parameters for which said step of determining has determined that the adjusting value should not be used, the signal processing circuit with the reference value represented by the setting data selected by said step of selecting;

a step of calculating, for each of the parameters for which said determination section has determined that the adjusting value should be used, a new setting value of the parameter on the basis of the reference values represented by the selected one item of setting data and the adjusting value stored in said adjusting value storage section; and a step of supplying the signal processing circuit with the new setting value calculated by said step of calculating.

* * * * *